United States Patent Office
2,748,092
Patented May 29, 1956

2,748,092

MODIFIED ALKYD RESIN AND PROCESS OF PREPARING SAME

John H. Daniel, Jr., and Ray T. Corkum, Stamford, Conn., assignors to American Cyanamid Company, New York, N. Y., a corporation of Maine No Drawing. Application March 4, 1952, Serial No. 274,838

8 Claims. (Cl. 260—22)

This invention relates to a process for producing an alkyd resin modified by a mixture of a styrene and an acrylonitrile; and more particularly, this invention relates to a process for preparing a modified alkyd resin wherein said alkyd resin is prepared by reacting a polycarboxylic acid consisting essentially of a polycarboxylic acid free from non-benzenoid unsaturation, a polyhydric alcohol and a monocarboxylic acid selected from the acids of natural drying oils and semi-drying oils. Still further, this invention relates to the compositions of matter produced in accordance with the process of the present invention and to surface coating compositions produced therefrom.

One of the objects of the present invention is to produce alkyd resins modified by a mixture of a monomeric styrene and a monomeric acrylonitrile without resorting to the use of any appreciable amount of an alpha beta-unsaturated polycarboxylic acid in the preparation of the alkyd resin, or in the use of any alpha beta-unsaturated monocarboxylic acid in the preparation of said alkyd resin, either of which are properly considered to be polyfunctional acids. A further object of the present invention is to produce a surface coating composition which has markedly improved solvent resistance which is prepared in accordance with the process of the present invention. A still further object of the present invention is to prepare these oil-modified alkyd resins in a mutually inert solvent, i. e., a solvent which is essentially inert to all of the components of the reaction and subsequently evaporating the solvent so as to leave the resin per se. A still further object of the present invention is to prepare these oil-modified alkyd resins without the use of the mutually inert solvent. These and other objects of the present invention will be discussed in greater detail hereinbelow.

In the preparation of vinyl monomer modified alkyd resins in the past, it has always been considered necessary to make use of an unsaturated alkyd resin which is prepared by reacting, for instance, an alpha beta-unsaturated polycarboxylic acid with a polyhydric alcohol, either with or without further modification by the addition of the acids of natural oils or semi-drying oils; or by the preparation of alkyd resins which are the reaction products of a polycarboxylic acid consisting essentially of a polycarboxylic acid free from non-benzenoid unsaturation, modified with an alpha, beta-unsaturated monocarboxylic acid and esterified with a polyhydric alcohol. It has never been considered possible to copolymerize a vinyl monomer such as monomeric styrene with a saturated alkyd resin of the type prepared by reacting a polycarboxylic acid, such as phthalic acid, or its anhydride, with a polyhydric alcohol, such as glycerol or pentaerythritol. The styrenated unsaturated oil-modified saturated alkyd resins prepared according to the process set forth in U. S. applications, Serial Nos. 34,565 and 34,567, filed in the names of Leonard C. Cadwell and John C. Petropoulos on June 22, 1948, each now abandoned, have many desirable characteristics with respect to hardness of film, film clarity, solvent resistance and the like. However, we have discovered that by using a mixture of monomeric styrene and monomeric acrylonitrile in well-defined proportions, we are able to produce a clear, homogeneous copolymer of alkyd resins prepared by reacting such components as phthalic anhydride, glycerol and linseed oil fatty acids having improved properties over the same type of alkyd resins wherein a styrene alone is used as the vinyl monomer modifier. The surface coating materials prepared according to the present invention display unusual solvent resistance, hardness and mar resistance, over and beyond that which the prior art surface coating materials have displayed. These surface coating materials are additionally rapid air-drying compositions and are particularly utilizable in varnishes, paints, enamels and lacquers.

In order that the present invention may be more completely understood, the following detailed examples are set forth, in which all parts are parts by weight. These examples are set forth primarily for the purpose of illustration and any specific enumeration of detail set forth therein should not be interpreted as limitations on the case, except as indicated in the appended claims.

EXAMPLE 1

Introduce into a suitable reaction chamber equipped with thermometer, stirrer and a tube for admitting inert gas below the surface of the charge, 592 parts of phthalic anhydride, 1032 parts of linseed oil monoglyceride and 116 parts of 98% glycerin. The charge is then heated to about 220° C. and heating is allowed to continue until the esterification reaction has proceeded sufficiently to yield an acid number of about 20. Thereupon, 69 parts of tung oil are added and heating is continued and an additional 40 parts of phthalic anhydride are added before the completion of the reaction, in order to modify the final characteristics of the resin. The final alkyd resin has an acid number of 4.2 and a viscosity of U on the Gardner-Holdt scale at 25° C. when measured on a 60% solids solution of the resin in mineral spirits.

180 parts of the alkyd resin thus produced and 300 parts of toluene are introduced into a suitable reaction chamber equipped with thermometer, stirrer and reflux condenser and the charge heated to reflux. Thereupon, a mixture of 90 parts of styrene (monomeric), 30 parts of acrylonitrile, 0.012 part of hydroquinone and 6 parts of cumene hydroperoxide are added at a constant rate in comparatively small increments over a four hour period and the refluxing is continued for approximately 9 hours. The viscosity of a 44% solid solution of the resin was about B–C on the Gardner-Holdt scale at 25° C.; the color was about 8–9 (Gardner, 1933); and the appearance of the resin solution was clear and bright.

EXAMPLE 2

Into a suitable reaction chamber equipped as in Example 1, introduce 148 parts of phthalic anhydride, 237 parts of soya monoglycerides and 35.7 parts of glycerin. The charge is then heated to about 220° C., as in Example 1, and after the reaction material is found to be clear at room temperature, 35 parts of oiticica oil are added and the heating continued. When the acid number reaches approximately 10 or less, the heating is stopped.

180 parts of the alkyd resin prepared according to the preceding Example 1 and 300 parts of xylol are introduced into a suitable reaction chamber equipped with thermometer, stirrer and reflux condenser and the mixture is heated to reflux temperature, whereupon 90 parts of monomeric styrene, 30 parts of acrylonitrile, 0.012 part of hydroquinone and 6 parts of cumene hydroperoxide are introduced slowly in comparatively small increments over a period of about 4 hours and the refluxing is continued after the addition of the mixture is completed for a period of about 4 hours additionally, while maintaining reflux conditions. The resulting copolymer had the following characteristics: viscosity on the Gardner-Holdt scale at 25° C., X; color, 10–11 (Gardner, 1933); solids, 46.3%; conversion of the monomers, 85%; appearance, clear and bright.

EXAMPLE 3

Into a suitable reaction chamber equipped as in Example 1, introduce 198 parts phthalic anhydride, 242 parts of soya monoglyceride, 48 parts of p-tertiarybutylbenzoic acid and 43 parts of glycerin. After the materials are charged to the reaction chamber, the container is heated up to and maintained at about 230° C. until the acid number is about 10 or less.

Into a suitable reaction chamber, equipped as above with a reflux condenser, introduce 172.5 parts of the alkyd resin prepared immediately hereinabove, 7.5 parts of oiticica oil and 300 parts of xylol and heat the mixture to the reflux temperature and add thereto a mixture of 90 parts of monomeric styrene, 30 parts of monomeric acrylonitrile, 0.012 part of hydroquinone and 6 parts of cumene hydroperoxide. The addition of this latter mixture is accomplished by adding said mixture in comparatively small increments over a 4 hour period, while maintaining refluxing conditions. The refluxing is then continued after the addition of the monomeric mixture for an additional 6 hour period. The copolymer thus produced has the following characteristics: viscosity, G—H on the Gardner-Holdt scale; color, 11 (Gardner, 1933); solids, 46.4%; conversion of the monomers, 85%; and appearance again is clear and bright.

EXAMPLE 4

To a suitable reaction chamber equipped as indicated hereinabove, introduce 148 parts of phthalic anhydride, 62.5 parts linseed oil, 227 parts of linseed oil monoglyceride, and 35 parts of glycerin. The reactants are heated to and maintained at about 225% C. for a period of time sufficient to produce an acid number of less than 10 and a viscosity of U–V on the Gardner-Holdt scale at 25° C., measured on a 60% solids solution of the resin in mineral spirits.

To a suitable reaction chamber equipped with thermometer, stirrer and reflux condenser, add 180 parts of the alkyd resin prepared immediately hereinabove, 300 parts of xylol and heat the reactant charge to 120° C. Thereafter, add a mixture of 90 parts of monomeric styrene, 30 parts of acrylonitrile and 6 parts of tertiarybutyl hydroperoxide over a period of about 1 hour. The contents of the flask are maintained at about 120° C. during the addition of the monomeric mixture and for an additional 7 hours thereafter. The resultant resin has the following characteristics: viscosity on the Gardner-Holdt scale at 25° C., U–V; color, 8 (Gardner, 1933); solids, 46.4%; conversion, 84%; and the film was clear.

A prior art copolymer resin is prepared in substantially the same manner, using an alkyd resin prepared substantially in accordance with the first paragraph of this example, as follows: 256 parts of said alkyd resin, 300 parts of xylol are introduced into a suitable reaction vessel and heated to 120° C. and thereto there is added a mixture of 100 parts of styrene and 3.5 parts of benzoyl peroxide over a 1 hour period. While maintaining the temperature of the container at about 120–140° C., after the addition of the monomeric styrene is completed, the reaction mass is maintained at 120–140° C. for an additional 7 hours. The following are the characteristics of this copolymer: viscosity on the Gardner-Holdt scale at 25° C., B–C; solids, 48.4%; conversion, 64.2%; and the film is hazy. It can be clearly seen from these two portions of Example 4 and the copolymer preparations that the one made with the acrylonitrile and styrene is markedly improved over the prior art alkyd resin made with the styrene alone.

EXAMPLE 5

To a suitable reaction chamber equipped with a stirrer, thermometer and a tube for admitting inert gas, there is charged 962 parts of phthalic anhydride, 406 parts of linseed oil, 1476 parts of linseed oil monoglyceride and 241 parts of a 98% glycerin. The charge is heated during constant stirring and while a stream of inert gas, such as nitrogen, is being passed therethrough, until a temperature of about 225° C. is reached. This temperature is maintained until a 60% solid solution of the resin in mineral spirits has a viscosity of V on the Gardner-Holdt scale at 25° C. and an acid number of 9.5 is reached.

330 parts of the alkyd prepared hereinabove is dissolved in 600 parts of Solvesso No. 150 (a high-boiling hydrocarbon solvent of high Kauri-butanol value) and the mixture is heated to about 140° C. While this temperature is being maintained, a mixture of 202.5 parts of monomeric styrene, 67.5 parts of monomeric acrylonitrile and 6.0 parts of ditertiarybutylperoxide is added gradually in comparatively small increments over a period of about 4 hours. The heating is continued for an additional 5 hours after the monomer addition is completed. At the end of this heating period, the viscosity on the Gardner-Holdt scale at 25° C. is X–Y, the color is 10–11 (Gardner, 1933); and a conversion of 93% of the monomer has been effected.

EXAMPLE 6

360 parts of the alkyd resin prepared according to Example 5 and 600 parts of Amsco F–80 (a high-boiling hydrocarbon solvent of high Kauri-butanol value) are introduced into a suitable reaction chamber equipped as above and a mixture of 180 parts of styrene, 60 parts of acrylonitrile and 6 parts of ditertiarybutylperoxide are introduced and heat-treated as indicated in Example 5, hereinabove. The final characteristics of the modified alkyd are as follows: viscosity on the Gardner-Holdt scale, X–Y; color, 9–10 (Gardner, 1933) and the conversion of the monomers is 94.5%. The reaction temperatures range between 146–168° C. during the reaction with the monomeric mixture.

EXAMPLE 7

Into a suitable reaction chamber equipped as above, there is introduced 592 parts of phthalic anhydride, 704 parts of Plastolein 9305 (a cottonseed oil fraction), 184 parts of dehydrated castor oil and 376 parts of 98% glycerin. The procedure is carried out as indicated hereinabove and the characteristics of the finally-produced alkyd resin are as follows: the acid number, 7–9; the viscosity of a 60% solid solution of the resin in mineral spirits is about Z on the Gardner-Holdt scale at 25° C.

180 parts of the above-prepared alkyd resin and 300 parts of toluene are introduced into a suitable reaction chamber equipped as above and to the mixture, heated as above, there is added a mixture of 90 parts of monomeric styrene, 30 parts of acrylonitrile, 6 parts of cumene hydroperoxide and 0.012 part of hydroquinone. (The purpose for the addition of the hydroquinone to the mixture of the monomers is to prevent the premature polymerization of the monomers from taking place prior to the addition of the same to the hot alkyd solution.) At the end of a 6 hour period, following the 4 hour addition period, all being carried out under refluxing conditions, the resultant resin had the following characteristics: viscosity on the Gardner-Holdt scale at 25° C., Z; color, 7; conversion of the monomers was 84.2%.

EXAMPLE 8

Into a suitable reaction chamber equipped as above, there is introduced 520 parts of phthalic anhydride, 980 parts of linseed monoglyceride and 77 parts of a 98% glycerol. The charge is heated at about 220° C. until an acid number of about 10 is reached. The final characteristics of the resin with respect to viscosity is, in a 60% solids solution of the resin in mineral spirits, U–V on the Gardner-Holdt scale at 25° C.

330 parts of the alkyd resin thus prepared and 600 parts of xylol are charged into a suitable reaction chamber equipped with stirrer, thermometer, reflux condenser and the contents are heated to the reflux temperature. While maintaining the charge at reflux, a mixture of 180 parts of dimethyl styrene (essentially 2,4-dimethyl styrene), 90 parts of acrylonitrile, 0.024 part of hydroquinone and 12 parts of cumene hydroperoxide are added in comparatively small increments over a 4 hour interval and the heating is maintained at reflux during the addition and continued at that temperature level for about an additional 6 hours. After this reaction time, the viscosity of the resultant modified alkyd resin is about V+ on the Gardner-Holdt scale at 25° C. and showed a conversion of about 89% of the monomers.

EXAMPLE 9

636 parts of phthalic anhydride, 1288 parts of soya monoglyceride, 116 parts of dehydrated castor oil and 94.7 parts of a 98% glycerol are introduced into a suitable reaction chamber as indicated hereinabove and the alkyd resin is prepared which has a viscosity of H on the Gardner-Holdt scale at 25° C. when measured on a 60% solids solution of the resin in mineral spirits and an acid number of 8.2 is recorded.

360 parts of the alkyd resin thus produced and 600 parts of xylene are introduced into a suitable reaction chamber equipped with stirrer, thermometer and reflux condenser and the contents are heated to the reflux temperature and maintained at that level while a mixture of 180 parts of styrene, 60 parts of acrylonitrile and 6 parts of ditertiarybutylperoxide are added over a period of about 4 hours and after the addition of the monomeric mixture is completed, refluxing is continued for an additional 6 hour period. The finished resin has a viscosity of about Y on the Gardner-Holdt scale and a conversion of the monomers is about 98%.

In the preparation of the oil-modified alkyd resin of the present invention, prior to the coreaction of the resin with the monomeric materials, one may use as the polycarboxylic acid component any polycarboxylic acid which is free from non-benzenoid unsaturation, such as phthalic acid, succinic, glutaric, cebacic, adipic, pimelic, suberic, azelaic, tricarballylic and the like. The use of the expression "polycarboxylic acid" not only includes the acids per se but also is intended to include the anhydrides of these acids. In the preparation of the resin, it is possible to use these acids or acid anhydrides either singly or in combination with one another.

Amongst the different polyhydric alcohols that may be used in the practice of the process of the present invention are such alcohols as diethylene glycol, ethylene glycol, trimethylene glycol, tetramethylene glycol, pentamethylene glycol, pinacol, arabitol, xylitol, adonitol, mannitol, dulcitol, sorbitol, glycerol, pentaerythritol, di-pentaerythritol and the like. These polyhydric alcohols can quite obviously be used singly or in combination with one another in the preparation of the alkyd resin per se.

In the preparation of the oil-modified alkyd resin prior to the copolymerization with the mixture of a styrene and an acrylonitrile, the viscosity requirement is not particularly critical, although it is preferred to permit the reaction to proceed until a viscosity of a 60% solid solution of the resin in mineral spirits is within the range of about A–Z on the Gardner-Holt scale at 25° C. It is further preferred that in the coreaction of the starting materials, the reaction be permitted to continue until the acid number of the reaction mix is at least less than about 30. In the final reaction, in which the oil-modified alkyd resin is further modified by the copolymerization with the mixture of the monomers, the reaction should be permitted to proceed until the viscosity of the finished resin in a 50–60% solid solution of the resin in xylol is within the range of about F–Z–5 on the Gardner-Holdt scale, while the range L–Z–2 is preferred. The monomer conversion in the final coreaction product is generally over 70 and generally comfortably above 80.

The esterification which takes place during the formation of the oil-modified alkyd resin and the subsequent final copolymerization with the mixture of the monomeric acrylonitrile and monomeric styrene may be carried out in the presence of a mutually inert solvent, preferably one which has a Kauri-butanol value between the limits of 75–105, such as xylol, toluol, high-flash naphtha, Solvesso No. 100, Solvesso No. 150, heavy aromatic naphtha and the like. The initial alkyd resin may be prepared in solvents of even lower Kauri-butanol value, such as Varsol No. 1 and Varsol No. 2. Actually, it is not imperative that a solvent be used in either of these reactions, but the necessity of a much stricter control of conditions makes it much to be preferred that in these reactions a solvent be used. Given in more detail, the following table, the characteristics of some of these solvents are:

*Characteristics of hydrocarbon solvents distillation range ° F.*

| Solvent | Manufacturer | Specific Gravity | Initial Boiling Point | Temperature at 50% | Temperature at 90% | Final Boiling Point | Kauri-Butanol Value Toluene =100 | Aniline Point, ° F. |
|---|---|---|---|---|---|---|---|---|
| Xylol | Standard Oil of New Jersey. | | 276 | 284 | 288 | 292 | 93 | [1] 51 |
| Solvesso No. 100 | Standard Oil of New Jersey. | .875 | 306 | 317 | 387 | 343 | 90 | [1] 54 |
| Solvasol No. 75 | Socony Vacuum Oil Company. | .872 | 325 | 348 | 369 | 386 | 77 | [1] 82 |
| Solvesso No. 150 | | .892 | 375 | 387 | 392 | 410 | 83 | 68 |
| Toluol | | .869 | 227 | 231 | 232 | 233 | 100 | 50 |
| Hi-Flash Naphtha | | .868 | 320 | 333 | 345 | 365 | 90 | |
| Heavy Aromatic Naphtha | | .924 | 313 | 404 | 482 | 526 | 85 | 77 |
| Amsco F-80 | | .860 | 328 | 343 | | 412 | 80 | 80 |

[1] Mixed aniline point, ° F.

As illustrative examples of monocarboxylic acids which may be used in the preparation of the modified alkyd resin in accordance with the practice of the process of the present invention are the acids of soya oil, linseed oil, dehydrated castor oil, perilla oil, safflower oil, tung oil, oiticica oil and the like. It is, however, preferred to use the non-conjugated type of drying and semi-drying oils, either alone or in predominant amounts, such as about 95%. In addition to using these oil acids, one may use the monoglycerides of these acids or the oils themselves or mixtures thereof.

In the polymerization of the oil-modified alkyd resin with the mixture of the monomeric acrylonitrile and monomeric styrene, it is preferred that the total weight of the monomers based on the total weight of monomers and alkyd resin be within the range of 15–60%, with 25–50% range preferred. The ratio of the monomeric styrene to the monomeric acrylonitrile is between about 19:1–1:1, with the preferred limits 9:1–2:1, respectively. We have discovered that the use of the acrylonitrile with the styrene is necessary in at least the minimum ratios set forth hereinabove and it has been shown in Example 4 hereinabove that the preparation of the modified alkyd resin without the use of acrylonitrile does not produce results as desirable as those shown when the combination of the two monomers is used. The higher the proportion of acrylonitrile to styrene, the greater the solvent resistance of the finished film. It must be remembered, however, that if the ratio of the acrylonitrile to styrene is too high, the compatibility of the resin solvent is lowered. In the preparation of the oil-modified alkyd resin, it is preferred that the usual limits of the preparation of an alkyd be utilized, namely, that about 20–50% of the total alkyd resin weight be saturated polycarboxylic acid or polycarboxylic acid free from non-benzenoid unsaturation and that the acids derived from the drying and semi-drying oils be present in an amount varying between about 45–70% of the total weight of the oil-modified alkyd resin. The amount of the polyhydric alcohol to be used in the preparation of the oil-modified alkyd resin will be in variable quantities, but calculable. It will depend upon the particular polycarboxylic acid selected and the acids of the particular drying or semi-drying oils and their respective amounts. It is necessary, however, to have a sufficient amount of the polyhydric alcohol present in order that the complete reaction will give a product having an acid number less than about 30. Consequently, from this it can be seen that on a stoichiometrical basis, the actual amount of a particular polyhydric alcohol to be used can be computed.

In the preparation of these oil-modified alkyd resins, the first reaction can be completed without the use of a catalytic agent, although in actual practice the use of such an agent may serve to increase the speed of the reaction. In the second phase of the reaction, that in which the oil-modified alkyd resin is copolymerized with the monomers, it is preferred that a catalytic agent be present. Several catalytic agents have been mentioned hereinabove in the specific examples enumerated. Other catalytic agents which may be used are cumene hydroperoxide and the like, or the tertiary alkyl substituted hydroperoxides and diperoxides, such as 2,2'-bis(tertiarybutylperoxy)-butane, ditertiarybutyl peroxide, tertiarybutyl hydroperoxide, tertiarybutylpropyl peroxide, tertiarybutylpentamethyl ethyl peroxide and the like. These catalytic agents obviously can be used separately or in combination with one another. It is only necessary that a small amount of these catalytic agents be present, such as about 0.5% up to about 5.0% by weight wherein said percentages are based on the total weight of the reacting materials. When these resins are to be used as surface coating materials, it is generally preferred to incorporate in the resin solution a small amount of some metallic dryer, such as cobalt naphthenate, lead naphthenate and the like. Quite obviously, one may make use of other conventional surface coating ingredients, such as pigments, anti-skimming agents, anti-cratering agents and the like. In the course of the examples set forth hereinabove, it is to be noted that the preparation of these resins have not been limited to the use of the monomeric acrylonitrile and the monomeric styrene alone; and it has been indicated that substituted acrylonitriles and substituted styrenes are utilizable. The results obtained when these substituted monomers are used are not quite as good as the results obtained when the unsubstituted acrylonitrile and the unsubstituted styrene are used. However, it is to be noted that notwithstanding the fact that the optimum results are achieved when the unsubstituted monomers are used, it is within the scope of this invention to use the substituted monomers as well. Among the monomeric styrenes which may be used are the substituted styrenes, both ring and side-chain. Illustrative of these various types are the following: alpha-methylstyrene, alpha-chlorostyrene and the like; ortho-methylstyrene, p-methylstyrene, m-methylstyrene, 2,4-dimethylstyrene, 2,4,5-trimethylstyrene, p-ethylstyrene, o-bromostyrene, 2,4-bromo-4-ethylstyrene, p-isopropylstyrene, p-chlorostyrene, 2,4-dichlorostyrene and the like. In the place of acrylonitrile per se, one can substitute methacrylonitrile, ethacrylonitrile, alpha-ethacrylonitrile, alpha-chloroacrylonitrile and the like. Quite obviously, if one so elected, one could make use of mixtures of the styrenes, as set forth hereinabove, or mixtures of the acrylonitriles shown hereinabove, provided that at least one component from the styrene and one component from the acrylonitrile group is present in each instance.

All of the acrylonitrile-containing copolymer resins give films of increased solvent resistance in comparison to similar resins with styrene alone as the alkyd modifier. Furthermore, it should be noted that when the mixture of the acrylonitrile and the styrene are used, greater film clarity results, as contrasted with results accomplished when styrene alone is used. In order to illustrate the improved solvent resistance of the resins of the present invention as contrasted with an all-styrene copolymer, such as one conventionally used in the art, the following illustration is set forth, in which tests were made on panels coated with the various copolymer resins by exposing a dry film of the resins to a mineral spirits solvent and examining the effect of the solvent on the film by means of a fingernail scratch at the indicated intervals. A rating of 100 indicates that no noticeable difference between the treated and untreated section of the panel was to be observed. The lower value indicates less satisfactory films.

AIR-DRIED PANELS

|  | Time | Ex. 8 [1] | Ex. 9 [1] | An all-styrene alkyd copolymer [1] |
|---|---|---|---|---|
| Resistance of films to mineral spirits: Varsol No. 1 | { 15 min.. <br> { 6 hrs.... | 100 <br> 100 | 95 <br> 50 | 60. <br> failed completely. |

BAKED PANELS, 10 MIN. AT 300° F.

|  | Time | Ex. 8 [1] | Ex. 9 [1] | An all-styrene alkyd copolymer [1] |
|---|---|---|---|---|
| Resistance of films to mineral spirits: Varsol No. 1 | { 1 hr.... <br> { 4 hrs.... | 100 <br> 85 | 80 <br> 80 | 60. <br> 40. |

[1] White enamels made with all TiO₂ pigment and a pigment to binder ratio of 0.9 to 1.0.

The resins made in accordance with the process of the present invention were drawn as films on panels in the following colors: blue, green and grey. Some of the panels were air-dried, others were baked. Each of these classes of panels were subjected to 6 months' exposure to outdoor atmospheric conditions and showed marked resistance to chalking and bronzing, which was far superior to control panels prepared from one of the better coating resins commercially available today.

We claim:
1. A process for the preparation of a modified alkyd resin which comprises heating reactants consisting of (1) a polycarboxylic acid consisting essentially of a polycarboxylic acid free from non-benzenoid unsaturation, (2) a polyhydric alcohol and (3) a material selected from the group consisting of natural drying oils, semi-drying oils, their acids, and monoglycerides, until an acid number of less than 30 is reached, adding thereto a mixture of monomers consisting of (4) a monomeric styrene selected from the group consisting of alpha methylstyrene, alpha chlorostyrene, ortho methylstyrene, para methylstyrene, meta methylstyrene, 2,4-dimethyl styrene, 2,4,5-trimethyl styrene, para ethylstyrene, ortho bromostyrene, para isopropylstyrene, para chlorostyrene, 2,4-dichlorostyrene, and styrene and (5) a monomeric acrylonitrile selected from the group consisting of acrylonitrile, methacryloni- trile, ethacrylonitrile, alpha ethacrylonitrile, alpha chloroacrylonitrile, and heat reacting the mixture in the presence of a peroxide catalyst and a mutually inert solvent until a 60% solids solution of the modified resin in a hydrocarbon solvent has a viscosity of F-$Z_5$ on the Gardner-Holdt scale at 25° C., wherein the combined weight of the monomers varies between 15 and 60% of the total combined weight of the alkyd and monomers; the weight ratios of said monomeric styrene to said monomeric acrylonitrile is within the range of 19:1 and 1:1, respectively.

2. A process for the preparation of a modified alkyd resin which comprises heating reactants consisting of (1) a polycarboxylic acid consisting essentially of a polycarboxylic acid free from non-benzenoid unsaturation, (2) a polyhydric alcohol and (3) a material selected from the group consisting of natural drying oils, semi-drying oils, their acids, and monoglycerides, until an acid number of less than 30 is reached, adding thereto a mixture of monomers consisting of (4) monomeric styrene, and (5) monomeric acrylonitrile, and heat reacting the mixture in the presence of a peroxide catalyst and a mutually inert solvent until a 60% solids solution of the modified resin in a hydrocarbon solvent has a viscosity of F-$Z_5$ on the Gardner-Holdt scale at 25° C., wherein the combined weight of the monomers varies between 15 and 60% of the total combined weight of the alkyd and monomers; the weight ratios of said monomeric styrene to said monomeric acrylonitrile is within the range of 19:1 and 1:1, respectively.

3. A process for the preparation of a modified alkyd resin which comprises heating reactants consisting of (1) a polycarboxylic acid consisting essentially of a polycarboxylic acid free from non-benzenoid unsaturation, (2) a polyhydric alcohol and (3) a material selected from the group consisting of natural drying oils, semi-drying oils, their acids, and monoglycerides, until an acid number of less than 30 is reached, adding thereto a mixture of monomers consisting of (4) monomeric styrene and (5) monomeric acrylonitrile, and heat reacting the mixture in the presence of a peroxide catalyst and a mutually inert solvent until a 60% solids solution of the modified resin in a hydrocarbon solvent has a viscosity of L-$Z_2$ on the Gardner-Holdt scale at 25° C., wherein the combined weight of the monomers varies between 15 and 60% of the total combined weight of the alkyd and monomers; the weight ratios of said monomeric styrene to said monomeric acrylonitrile is within the range of 19:1 and 1:1, respectively.

4. A process for the preparation of a modified alkyd resin which comprises heating reactants consisting of (1) a polycarboxylic acid consisting essentially of a polycarboxylic acid free from non-benzenoid unsaturation, (2) a polyhydric alcohol and (3) a material selected from the group consisting of natural drying oils, semi-drying oils, their acids, and monoglycerides, until an acid number of less than 30 is reached, adding thereto a mixture of monomers consisting of (4) monomeric styrene and (5) monomeric acrylonitrile, and heat reacting the mixture in the presence of a peroxide catalyst and a mutually inert solvent until a 60% solids solution of the modified resin in a hydrocarbon solvent has a viscosity of L-$Z_2$ on the Gardner-Holdt scale at 25° C., wherein the combined weight of the monomers varies between 15 and 60% of the total combined weight of the alkyd and monomers; the weight ratios of said monomeric styrene to said monomeric acrylonitrile is within the range of 9:1 and 2:1, respectively.

5. A process for the preparation of a modified alkyd resin which comprises heating reactants consisting of (1) a polycarboxylic acid consisting essentially of a polycarboxylic acid free from non-benzenoid unsaturation, (2) a polyhydric alcohol and (3) a material selected from the group consisting of natural drying oils, semi-drying oils, their acids, and monoglycerides, until an acid number of less than 30 is reached, adding thereto a mixture of monomers consisting of (4) monomeric styrene and (5) monomeric acrylonitrile, and heat reacting the mixture in the presence of a peroxide catalyst and a mutually inert solvent until a 60% solids solution of the modified resin in a hydrocarbon solvent has a viscosity of L-$Z_2$ on the Gardner-Holdt scale at 25° C., wherein the combined weight of the monomers varies between 25 and 50% of the total combined weight of the alkyd and monomers; the weight ratios of said monomeric styrene to said monomeric acrylonitrile is within the range of 9:1 and 2:1, respectively.

6. A process for the preparation of a modified alkyd resin which comprises heating reactants consisting of (1) phthalic anhydride, (2) pentaerythritol and (3) linseed oil fatty acids until an acid number of less than 30 is reached, adding thereto a mixture of monomers consisting of (4) monomeric styrene and (5) monomeric acrylonitrile, and heat reacting the mixture in the presence of a peroxide catalyst and a mutally inert solvent until a 60% solids solution of the modified resin in a hydrocarbon solvent has a viscosity of L-$Z_2$ on the Gardner-Holdt scale at 25° C., wherein the combined weight of the monomers varies betwen 25 and 50% of the total combined weight of the alkyd and monomers; the weight ratios of said monomeric styrene to said monomeric acrylonitrile is within the range of 9:1 and 2:1, respectively.

7. A process for the preparation of a modified alkyd resin which comprises heating reactants consisting of (1) a polycarboxylic acid consisting essentially of a polycarboxylic acid free from non-benzenoid unsaturation, (2) a polyhydric alcohol and (3) a material selected from the group consisting of natural drying oils, semi-drying oils, their acids, and monoglycerides, until an acid number of less than 30 is reached, adding thereto in small increments a mixture of monomers consisting of (4) monomeric styrene, and (5) monomeric acrylonitrile, and heat reacting the mixture in the presence of a peroxide catalyst and a mutually inert solvent until 60% solids solution of the modified resin in a hydrocarbon solvent has a viscosity of F-$Z_5$ on the Gardner-Holdt scale at 25° C., wherein the combined weight of the monomers varies between 15 and 60% of the total combined weight of the alkyd and monomers; the weight ratios of said monomeric styrene to said monomeric acrylonitrile is within the range of 19:1 and 1:1, respectively.

8. The product produced according to the process of claim 1.

References Cited in the file of this patent

UNITED STATES PATENTS

| | | |
|---|---|---|
| 2,392,710 | Wakeford et al. | Jan. 8, 1946 |
| 2,590,654 | Schmutzler | Mar. 25, 1952 |
| 2,600,623 | Daniel et al. | June 17, 1952 |
| 2,627,509 | Arvin | Feb. 3, 1953 |